(12) United States Patent
Nakata et al.

(10) Patent No.: US 8,513,171 B2
(45) Date of Patent: Aug. 20, 2013

(54) LUBRICANT COMPOSITION, SPEED REDUCTION GEAR, AND ELECTRIC POWER STEERING APPARATUS

(75) Inventors: Ryuji Nakata, Osaka (JP); Miwa Hokii, Kariya (JP); Mitsuhiro Kakizaki, Hiratsuka (JP); Daisuke Tsutsui, Fujisawa (JP)

(73) Assignees: JTEKT Corporation, Osaka-Shi (JP); Kyodo Yushi Co., Ltd., Fujisawa-Shi (JP)

( * ) Notice: Subject to any disclaimer, the term of this patent is extended or adjusted under 35 U.S.C. 154(b) by 206 days.

(21) Appl. No.: 13/119,029

(22) PCT Filed: Oct. 14, 2009

(86) PCT No.: PCT/JP2009/005352
§ 371 (c)(1),
(2), (4) Date: Mar. 15, 2011

(87) PCT Pub. No.: WO2010/044259
PCT Pub. Date: Apr. 22, 2010

(65) Prior Publication Data
US 2011/0168479 A1 Jul. 14, 2011

(30) Foreign Application Priority Data
Oct. 16, 2008 (JP) ................. 2008-267642

(51) Int. Cl.
*C10M 169/06* (2006.01)
*C10M 129/40* (2006.01)
*C10M 149/20* (2006.01)

(52) U.S. Cl.
USPC ........... 508/172; 508/528; 508/269; 508/271; 508/279; 508/365

(58) Field of Classification Search
USPC .................. 508/528, 172, 269, 271, 279, 365
See application file for complete search history.

(56) References Cited

U.S. PATENT DOCUMENTS
6,214,778 B1 4/2001 Todd
2003/0176298 A1 9/2003 Nakatani et al.
(Continued)

FOREIGN PATENT DOCUMENTS
JP A-9-25344 1/1997
JP A 9-104889 4/1997
(Continued)

OTHER PUBLICATIONS
International Preliminary Report on Patentability issued in International Application No. PCT/JP2009/005352 dated May 17, 2011 (with translation).

(Continued)

Primary Examiner — Jim Goloboy
(74) Attorney, Agent, or Firm — Oliff & Berridge, PLC

(57) ABSTRACT

A lubricant composition, which is low in friction, does not have an attacking property against polyamide resin, etc., is excellent in heat resistance, and especially does not undergo deterioration or loss of the respective characteristics in a short term when used under a high temperature environment, is provided along with a speed reduction gear and an electric power steering apparatus that use the lubricant composition. The lubricant composition has blended therein a synthetic hydrocarbon oil, a urea thickener, zinc stearate, and a sulfur-based antioxidant. A speed reduction gear has a portion of engagement of a small gear and a large gear filled with the lubricant composition. In an electric power steering apparatus, an output of a steering assisting electric motor is speed reduced and transmitted to a steering mechanism via the speed reduction gear.

5 Claims, 1 Drawing Sheet

(56) References Cited

U.S. PATENT DOCUMENTS

| | | | |
|---|---|---|---|
| 2004/0186025 A1* | 9/2004 | Nakatani et al. | 508/130 |
| 2005/0020456 A1* | 1/2005 | Kawamura et al. | 508/364 |
| 2007/0149422 A1* | 6/2007 | Miyajima et al. | 508/451 |
| 2008/0161214 A1 | 7/2008 | Asakura et al. | |
| 2009/0270290 A1 | 10/2009 | Sawaguchi et al. | |
| 2010/0029524 A1* | 2/2010 | Fujinami et al. | 508/496 |

FOREIGN PATENT DOCUMENTS

| | | |
|---|---|---|
| JP | A 10-088167 | 4/1998 |
| JP | A 2004-83797 | 3/2004 |
| JP | A 2004-314916 | 11/2004 |
| JP | A 2005-132879 | 5/2005 |
| JP | A 2006-182909 | 7/2006 |
| JP | A 2007-100107 | 4/2007 |
| JP | A 2008-101122 | 5/2008 |
| WO | WO 2004/113480 A1 | 12/2004 |
| WO | WO 2004/113481 A1 | 12/2004 |
| WO | WO 2006/064053 A1 | 6/2006 |
| WO | WO 2007/129720 A1 | 11/2007 |
| WO | WO 2008050787 A1 * | 5/2008 |

OTHER PUBLICATIONS

Mar. 27, 2012 Extended European Search Report issued in European Patent Application No. 09820437.3.

International Search Report issued in PCT/JP2009/005352, mailed Jan. 19, 2010. (with English-language translation).

* cited by examiner

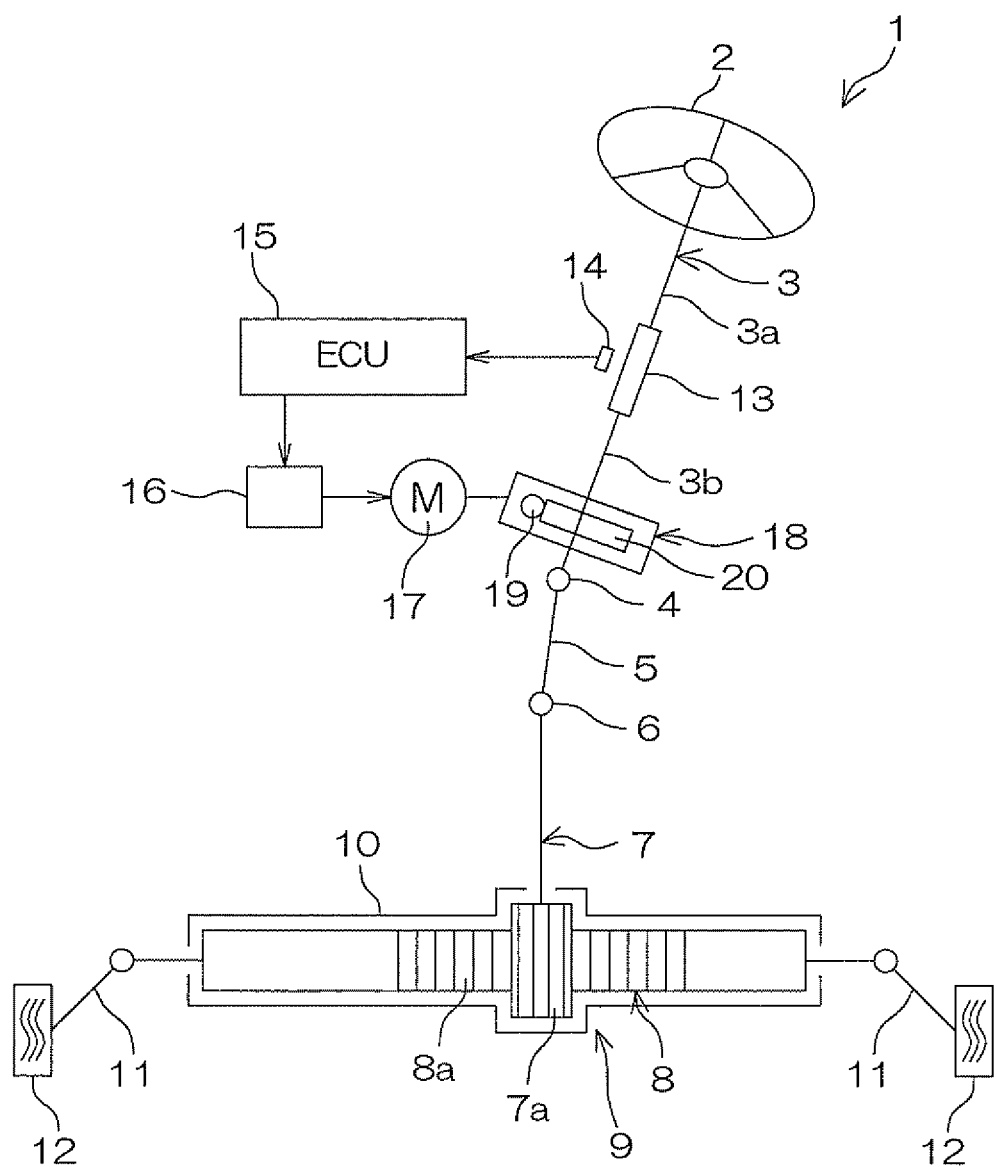

LUBRICANT COMPOSITION, SPEED REDUCTION GEAR, AND ELECTRIC POWER STEERING APPARATUS

TECHNICAL FIELD

The present invention relates to a lubricant composition that can be used favorably, for example, in a speed reduction gear, which includes a small gear and a large gear, or in a rolling bearing, ball screw, etc., and also relates to a speed reduction gear filled with the lubricant composition and an electric power steering apparatus incorporating the speed reduction gear.

BACKGROUND ART

A speed reduction gear is used in an electric power steering apparatus of an automobile. For example, with a column type EPS, a rotation of an electric motor is reduced in speed and amplified in output by being transmitted from a small gear, such as a worm gear, to a large gear, such as a worm wheel, in the speed reduction gear and is thereafter imparted to a steering shaft to perform torque assist of a steering operation. A region of the speed reduction gear that includes at least a portion of engagement of the small gear and the large gear is filled with grease or other lubricant composition for lubrication.

In a generally used lubricant composition, for example, a thickener, such as a urea thickener, and an additive, such as a low friction additive, are added to a base oil, such as a synthetic hydrocarbon oil. As the low friction additive, a metal soap, such as lithium stearate and calcium stearate, is used. Among these, lithium stearate is especially excellent in function as a low friction additive, that is, in the function of lowering a friction coefficient of the lubricant composition and is thus used widely (see, for example, Patent Documents 1 and 2).

By using a lubricant composition that contains lithium stearate, an efficiency of speed reduction in a speed reduction gear can be improved and a torque of an electric power steering apparatus incorporating the speed reduction gear can be reduced to improve a steering sensation of an automobile incorporating the electric power steering apparatus. However, especially under a high temperature environment, such as in a periphery of an engine of an automobile, a conventional lubricant composition that contains lithium stearate expresses an attacking property against polyamide resin, etc., that is popularly used as a component material of mechanical parts in mechanical fields and may cause a problem of shortening a durability life of a mechanical part (for example, a gear) made of the polyamide resin, etc.

Zinc stearate is known as a metal soap, which, when contained in a lubricant composition, can function as a satisfactory low friction additive substantially equivalent to lithium stearate (see, for example, Patent Documents 3 to 5). Also, according to examination by the inventors, zinc stearate provides an action of alleviating the attacking property against polyamide resin, etc. Use of a lubricant composition containing zinc stearate in place of lithium stearate in combination with a gear, etc., made of polyamide resin, etc., can thus be considered.

PRIOR ART DOCUMENTS

Patent Documents

Patent Document 1: Japanese Published Unexamined Patent Application No. 2004-83797

Patent Document 2: Japanese Published Unexamined Patent Application No. 2004-314916

Patent Document 3: Japanese Published Unexamined Patent Application No. 9-104889

Patent Document 4: Japanese Published Unexamined Patent Application No. 10-88167

Patent Document 5: Japanese Published Unexamined Patent Application No. 2007-100107

SUMMARY OF THE INVENTION

Object(s) of the Invention

However, zinc stearate in itself is not adequately heat resistant in comparison to other metal soaps, such as lithium stearate, and readily undergoes oxidative deterioration when contained in a lubricant composition and used under a high temperature environment, such as in a periphery of an engine of an automobile. When zinc stearate undergoes oxidative deterioration, its function particularly as a low friction additive degrades or is lost readily in a short term.

A lubricant composition that is low in friction and can maintain satisfactory lubrication while suppressing deterioration of polyamide resin, etc., and is yet excellent in heat resistance is demanded.

This demand is not restricted to the speed reduction gear but applies likewise to a rolling bearing, ball screw, etc., having, for example, a retainer formed of polyamide resin, etc.

An object of the present invention is to provide a lubricant composition, which is low in friction, does not have an attacking property against polyamide resin, etc., is excellent in heat resistance, and especially does not undergo deterioration or loss of the respective characteristics in a short term when used under a high temperature environment, and to provide a speed reduction gear and an electric power steering apparatus that use the lubricant composition.

Means for Achieving the Object(s)

To resolve the above issue, the inventors carried out various examinations concerning a base oil and an additive that make up a lubricant composition along with zinc stearate. As a result, the inventors found that it is favorable to use a sulfur-based antioxidant as an antioxidant along with using a synthetic hydrocarbon oil as the base oil. That is, a sulfur-based antioxidant not only has a function of decomposing peroxides to prevent oxidation and thereby provide an action of suppressing the oxidative deterioration of zinc stearate in the lubricant composition but also suppresses deterioration of polyamide resin, etc., by this function and furthermore functions as an anti-wear agent.

Thus, by making a sulfur-based antioxidant be contained as an antioxidant along with zinc stearate in a synthetic hydrocarbon oil, which does not readily degrade a polyamide resin due to not having a polar group in the molecule, a lubricant composition, which is low in friction, does not have an attacking property against polyamide resin, etc., and is excellent in heat resistance, can be provided beyond the effect of having simply selected the antioxidant. The present invention thus provides a lubricant composition that includes at least a synthetic hydrocarbon oil, a urea thickener, zinc stearate, and a sulfur-based antioxidant.

Preferably in the lubricant composition according to the present invention, zinc stearate is made to function as a thickener as well. The lubricant composition can thereby be made even lower in friction, not to have an attacking property against polyamide resin, etc., and yet excellent in heat resistance.

In order to make zinc stearate function as the thickener, zinc stearate is not added afterwards to the lubricant composition in a form of a powder but zinc stearate is completely dissolved in the synthetic hydrocarbon oil that is the base of the lubricant composition to form a grease.

As the sulfur-based antioxidant, at least one type of compound selected from the group consisting of benzothiazole compounds, dithiocarbamate compounds, and benzimidazole compounds is preferable. All of these compounds prevent oxidative deterioration of zinc stearate, are excellent in the above-described function of suppressing the deterioration of polyamide resin, etc., and also function satisfactorily as anti-wear agents. The lubricant composition can thus be made even lower in friction, not to have an attacking property against polyamide resin, etc., and yet excellent in heat resistance.

Preferably, the lubricant composition according to the present invention includes a rust inhibitor and the rust inhibitor is a benzotriazole compound. A benzotriazole compound does not have a function of promoting oxidative deterioration of zinc stearate and the heat resistance of the lubricant composition can thus be improved further while satisfactorily rustproofing a metal portion of the speed reduction gear, etc.

A speed reduction gear according to the present invention includes a small gear and a large gear that are mutually engaged and, due to a region including at least a portion of engagement of the small gear and the large gear being filled with the lubricant composition of the present invention, is excellent in speed reduction efficiency and, especially in a case where gears made of polyamide resin, etc., are used to achieve light weight, is capable of maintaining the speed reduction efficiency in a satisfactory range over a long term while preventing deterioration of the gears.

Also, an electric power steering apparatus according to the present invention includes an electric motor, which assists steering of a steering mechanism of an automobile, and the speed reduction gear, and because an output of the electric motor is transmitted to the steering mechanism via the speed reduction gear, a torque of the electric power steering apparatus can be reduced while suppressing deterioration of the gears made of polyamide resin, etc., to thereby enable an effect of improving a steering sensation of the automobile incorporating the electric power steering apparatus to be maintained satisfactorily over a long term.

Effect(s) of the Invention

By the present invention, a lubricant composition, which is low in friction, does not have an attacking property against polyamide resin, etc., is excellent in heat resistance, and especially does not undergo deterioration or loss of the respective characteristics in a short term when used under a high temperature environment, can be provided along with a speed reduction gear and an electric power steering apparatus that use the lubricant composition.

BRIEF DESCRIPTION OF THE DRAWINGS

[FIG. 1] is a schematic view of an electric power steering apparatus according to an embodiment of the present invention.

BEST MODE FOR CARRYING OUT THE INVENTION

<Lubricant Composition>

A lubricant composition according to the present invention includes at least a synthetic hydrocarbon oil, a urea thickener, zinc stearate, and a sulfur-based antioxidant.

As an example of the synthetic hydrocarbon oil, poly-α-olefin, obtained by restrictingly polymerization just a few molecules of a straight-chain α-olefin having 6 to 18 carbons and then hydrogenating residual unsaturated double bonds, etc., can be cited.

The poly-α-olefin or other synthetic hydrocarbon oil preferably has kinematic viscosity of no less than 18 mm$^2$/s and no more than 64 mm$^2$/s and especially preferably no less than 30 mm$^2$/s and no more than 48 mm$^2$/s. A lubricant composition capable of suppressing increase in rotational torque with minimal friction over a wide temperature range and is excellent in lubricity due to having an adequate oil film thickness can thereby be formed.

A content proportion of the synthetic hydrocarbon oil in a total amount of the lubricant composition is a remainder of subtraction of the other components forming the lubricant composition. That is, the content proportion of the synthetic hydrocarbon oil is set so that the total amount resulting from adding the synthetic hydrocarbon to predetermined amounts of the other components is 100% by mass.

As the urea thickener, any of various urea thickeners, such as diurea, triurea, and tetraurea thickeners, maybe used and a diurea thickener is especially preferable. A diurea thickener has a structure expressed by Formula (1):

[Chemical Formula 1]

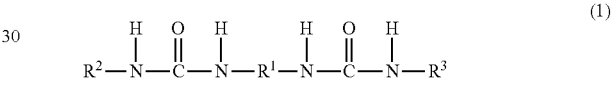

(1)

[in the formula, R$^1$ indicates a diisocyanate residue and R$^2$ and R$^3$ indicate amine residues that may be the same or different], and is synthesized by reacting a diisocyanate compound (2) and diamine compounds (3) and (4) as indicated by the following reaction formula.

[Chemical Formula 2]

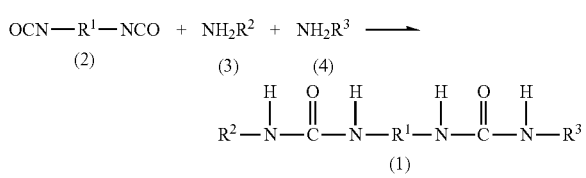

[In the formula, R$^1$, R$^2$, and R$^3$ are as described above.]

The reaction is preferably carried out in the synthetic hydrocarbon oil that is the base of the lubricant composition, and a lubricant composition of higher uniformity is thereby obtained. Specifically, the diisocyanate compound (2) and the amine compounds (3) and (4) are dissolved separately in the synthetic hydrocarbon oil to prepare a diisocyanate solution and an amine solution. The diurea thickener expressed by Formula (1) is then synthesized by gradually adding one of the solutions to the other solution while stirring to make the diisocyanate compound (2) and the amine compounds (3) and (4) react. The synthetic hydrocarbon oil is made into a grease by the synthesized diurea thickener.

As favorable examples of the diurea thickener, one type or two or more types of reaction product among a reaction product of 4,4'-diphenylmethane diisocyanate, an alkyl phenyl amine in which the number of carbons of the alkyl portion is 8 to 18 (p-dodecylamine, etc.), and cyclohexylamine, a reaction product of the 4,4'-diphenylmethane diisocyanate, stearylamine (octadecylamine), and oleylamine, and a reaction product of the 4,4'-diphenylmethane diisocyanate, stearylamine, and octylamine can be cited.

A content proportion of the urea thickener may be changed as suited according to usage conditions, etc., of the lubricant composition, and for example in a case of use for lubrication of a speed reduction gear to be used upon incorporation in an electric power steering apparatus, the content proportion is preferably no less than 7% by mass and no more than 10% by mass and especially preferably no less than 8% by mass and no more than 9% by mass of the total amount of the lubricant composition. When the content proportion of the urea thickener is less than the above range, so-called oil separation, with which the synthetic hydrocarbon oil separates from the grease, may occur readily, and when the above range is exceeded, the torque of the electric power steering apparatus may increase.

Zinc stearate is added in a powder state to the lubricant composition and made to function as a low friction additive, etc., or preferably made to function as a thickener in addition to being made to function as the low friction additive, etc., and in the latter case, zinc stearate is completely dissolved in the synthetic hydrocarbon oil that is the base of lubricant composition to form a grease as described above.

Specifically, a predetermined amount of zinc stearate is blended into the synthetic hydrocarbon oil and after heating while stirring to completely dissolve the zinc stearate, the mixture is cooled to room temperature while continuing to stir to thereby prepare a grease containing the zinc stearate as the thickener (may hereinafter be referred to in brief as "zinc stearate grease").

The zinc stearate grease and a grease containing the diurea thickener synthesized, for example, by the above reaction (may hereinafter be referred to in brief as "diurea grease") are then blended at predetermined proportions, stirred, and kneaded using a homogenizer, a three-roll mill, etc., to obtain the lubricant composition containing both the urea thickener and zinc stearate as the thickener.

Although the sulfur-based antioxidant and other additives are preferably added after preparation of the diurea grease and the zinc stearate grease or after mixing both greases, a component that does not inhibit the synthesis reaction of the diurea thickener, the forming of the grease by zinc stearate, etc., may be blended in the synthetic hydrocarbon oil in advance.

A content proportion of zinc stearate may be changed as suited according to the usage conditions, etc., of the lubricant composition. For example, in the case of use for lubrication of a speed reduction gear to be used upon incorporation in an electric power steering apparatus, the content proportion is preferably no less than 3% by mass and no more than 10% by mass and especially preferably no less than 5% by mass and no more than 8% by mass of the total amount of the lubricant composition.

When the content proportion of zinc stearate is less than the above range, an action of zinc stearate of alleviating an attacking property of the lubricant composition against polyamide resin, etc., a function as a low friction additive of making the lubricant composition low in friction, or a function as a thickener of forming an oil film having an adequate oil film thickness, etc., maybe inadequate. In the case where the above range is exceeded, the torque of the electric power steering apparatus, etc., may increase.

As the sulfur-based antioxidant, any of various compounds having a function of decomposing peroxides by the sulfur contained in the molecule and thereby preventing oxidative deterioration of zinc stearate and suppressing deterioration of polyamide resin, etc., may be used.

As examples of the compounds, a benzothiazole compound, a dithiocarbamine compound, and a benzimidazole compound can be cited.

[Chemical Formula 3]

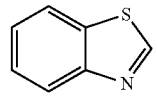

(5)

The benzothiazole compound which has a benzothiazole expressed by Formula (5) as a basic skeleton functions as antioxidant.

[Chemical Formula 4]

(6)

The dithiocarbamine compound which has a dithiocarbamic acid residue expressed by Formula (6) as a basic skeleton functions as antioxidant.

[Chemical Formula 5]

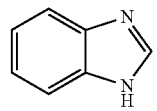

(7)

The benzimidazole compound which has a benzimidazole expressed by Formula (7) as a basic skeleton functions as antioxidant.

One type of the above compounds may be used solitarily or two or more types may be used in combination.

As specific examples of the benzothiazole compound, one type or two or more types of compound among 2-mercaptobenzothiazole or a zinc salt thereof, dibenzothiazyl disulfide, etc., can be cited, and 2-mercaptobenzothiazole is especially preferable.

Of the benzothiazole compounds, a content proportion of 2-mercaptobenzothiazole is preferably no less than 0.25% by mass and no more than 2% by mass and especially preferably no less than 0.5% by mass and no more than 2% by mass of the total amount of the lubricant composition. Also, a content proportion of dibenzothiazyl disulfide is preferably no less than 1% by mass and no more than 4% by mass and especially preferably no less than 2% by mass and no more than 4% by mass of the total amount of the lubricant composition.

When the content proportions are respectively less than the above ranges, a function of the benzothiazole compound of preventing the oxidative deterioration of zinc stearate and suppressing the deterioration of polyamide resin, etc., a function as an anti-wear agent, etc., maybe inadequate. Also, in the case where the above range is exceeded, a friction coefficient of the lubricant composition may be large and the torque of the electric power steering apparatus, etc., may increase.

As specific examples of the dithiocarbamine compound, one type or two or more types of compound among dibutyldithiocarbamate, methylene-bis-dibutyldithiocarbamate, etc., can be cited.

A content proportion of the dithiocarbamine compound is preferably no less than 0.5% by mass and no more than 3% by mass and especially preferably no less than 1% by mass and no more than 3% by mass of the total amount of the lubricant composition. When the content proportion is less than the above range, the function of the dithiocarbamine compound of preventing the oxidative deterioration of zinc stearate and suppressing the deterioration of polyamide resin, etc., function as an anti-wear agent, etc., maybe inadequate. Also, in the case where the above range is exceeded, the friction coefficient of the lubricant composition may be large and the torque of the electric power steering apparatus, etc., may increase.

As specific examples of the benzimidazole compound, one type or two or more types of compound among 2-mercaptobenzimidazole, 2-mercaptomethylbenzimidazole, 4-mercaptomethylbenzimidazole, 5-mercaptomethylbenzimidazole, and zinc salts of these, etc., can be cited.

A content proportion of the benzimidazole compound is preferably no less than 0.5% by mass and no more than 3% by mass and especially preferably no less than 1% by mass and no more than 3% by mass of the total amount of the lubricant composition. When the content proportion is less than the above range, the function of the benzimidazole compound of preventing the oxidative deterioration of zinc stearate and suppressing the deterioration of polyimide resin, etc., a function as an anti-wear agent, etc., may be inadequate. Also, in the case where the above range is exceeded, the friction coefficient of the lubricant composition may be large and the torque of the electric power steering apparatus, etc., may increase.

In a case where two or more types of compound are to be used in combination as the sulfur-based antioxidant, a favorable range of the total content proportion of the compounds is determined in consideration of the preferable ranges for the respective compounds.

The lubricant composition according to the present invention may contain other additives besides the above. As examples of the other additives, a rust inhibitor, a metal deactivator, a viscosity index improver, an oiliness agent, etc., can be cited. Among these, as the rust inhibitor, one type or two or more types of rust inhibitors among benzotriazole compounds, calcium sulfonate-based rust inhibitors, etc., can be cited, and a benzotriazole compound is especially preferable.

The benzotriazole compound does not have the function of promoting oxidative deterioration of zinc stearate and can thus further improve the heat resistance of the lubricant composition while satisfactorily rustproofing a metal portion of a speed reduction gear, etc. As the benzotriazole compound, a benzotriazole compound having benzotriazole expressed by Formula (8):

[Chemical Formula 6]

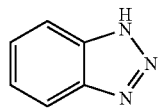

(8)

or a derivative thereof as a basic skeleton and functioning as a rust inhibitor can be cited. As specific compounds of benzotriazole compounds, one type or two or more types of compound among benzotriazole, which is expressed by Formula (8), 1-[N,N-bis(2-ethylhexyl)aminomethyl]-9-benzotriazole, 1-[N,N-bis(2-ethylhexyl)aminomethyl]-5-benzotriazole, etc., can be cited.

A content proportion of the benzotriazole compound is preferably no less than 0.01% by mass and no more than 0.5% by mass and especially preferably no less than 0.05% by mass and no more than 0.1% by mass of the total amount of the lubricant composition. When the content proportion is less than the above range, the function of the benzotriazole compound as a rust inhibitor may not be obtained adequately, and in the case where the above range is exceeded, a friction coefficient of the lubricant composition may be large.

A consistency of the lubricant composition may be set in a suitable range in accordance with usage. For example, in the case of use for lubrication of a speed reduction gear to be used upon incorporation in an electric power steering apparatus, the consistency at a measurement temperature of 40° C. is preferably No. 2 to No. 1 as expressed as an NLGI (National Lubricating Grease Institute) number.

A lubricant composition that is harder than the above range may increase the torque of the electric power steering apparatus, etc., and a lubricant composition that is softer than the above range may cause leakage from the electric power steering apparatus, etc., or cause oil separation.

<Speed Reduction Gear and Electric Power Steering Apparatus>

FIG. 1 is a schematic view showing the configuration of an embodiment of an electric steering apparatus according to the present invention. Referring to FIG. 1, the electric steering apparatus 1 has a steering shaft 3 connected to a steering member 2, such as a steering wheel, an intermediate shaft 5 connected to the steering shaft 3 through a universal joint 4, a pinion shaft 7 connected to the intermediate shaft 5 through a universal joint 6, and a rack bar 8 having rack teeth 8a meshed with pinion teeth 7a provided of the pinion shaft 7 and extending along the right and left of an automobile. The pinion shaft 7 and the rack bar 8 constitute a rack-and-pinion mechanism serving as a steering mechanism 9.

The rack bar 8 is supported so as to be linearly movable right and left through a plurality of bearings (not shown) within a rack housing 10 fixed to an automobile body. Both ends of the rack bar 8 are projected toward both the sides of the rack housing 10, and a tie rod 11 is coupled to each of the projected ends. Each of the tie rods 11 is connected to a corresponding steerable wheel 12 through a corresponding knuckle arm (not shown). When the steering member 2 is operated to rotate the steering shaft 3, the rotation is converted into the linear motion of the rack bar 8 along the right and left of the automobile by the pinion teeth 7a and the rack teeth 8a to turn the steerable wheel 12.

The steering shaft 3 is divided into an input shaft 3a communicating with the steering member 2 and an output shaft 3b communicating with the pinion shaft 7. Both the shafts 3a and 3b are connected to each other so as to be relatively rotatable on the same axis through a torsion bar 13. The torsion bar 13 is provided with a torque sensor 14 for detecting a steering torque from a displacement amount of relative rotation between both the shafts 3a and 3b. The results of the detection of the torque by the torque sensor 14 are given to an ECU (Electric Control Unit) 15.

The ECU 15 controls the driving of an electric motor 17 for steering assist through a driving circuit 16 on the basis of the results such as the detection of the torque and the detection of automobile speed given from an automobile speed sensor (not shown), for example. The output rotation of the electric motor 17 is reduced through a speed reduction gear 18, is transmitted to the pinion shaft 7, and is converted into the linear motion of the rack bar 8 to assist steering. The speed reduction gear 18 comprises a small gear 19 serving as an input shaft whose rotation is driven by the electric motor 17, and a large gear 20 meshed with the small gear 19 and connected to the output shaft 3b in the steering shaft 3 so as to be integrally rotatable. A meshing portion of the small gear 19 and the large gear 20 is filled with the lubricant composition according to the present invention.

The lubricant composition according to the present invention does not have attacking property against polyamide resin, etc., especially under a high temperature environment, such as in a periphery of an engine of an automobile, as described previously. Therefore, when at least one of the small gear 19 and the large gear 20 of the speed reduction gear 18, especially the teeth portion of the large gear 20 is formed by the polyamide resin, etc., the lubricant composition does not have a possibility of reducing durability life of the teeth portion. Since the lubricant composition is low in friction, an efficiency of speed reduction in the speed reduction gear 18 can be improved and a torque of the electric power steering apparatus 1 incorporating the speed reduction gear 18 can be reduced to improve a steering sensation of an automobile incorporating the electric power steering apparatus 1. Moreover, since the lubricant composition is excellent in heat resistance, and does not undergo deterioration or loss of the respective characteristics in a short term when used under a high temperature environment.

Polyamide resin (Nylon 6, Nylon 46, Nylon66, etc.) is mentioned as resin which is effective combining the lubricant composition according to the present invention. Moreover, polyacetal resin (POM), acrylonitrile-butadiene-styrene copolymer (ABS), polycarbonate resin, etc. are also mentioned as the above-mentioned resin.

The present invention is not limited to the above-mentioned embodiment. For example, as the speed reduction gear, the speed reduction gear containing warm and warm wheel explained previously is mentioned. Moreover, the speed reduction gear containing other gear train, such as helical gears and spur gears, are also mentioned.

The lubricant composition according to the present invention can be used as lubricant of other drive transfer mechanisms in which it has gear train containing two or more gears which mesh mutually, other than the speed reduction gear. Moreover, the lubricant composition can be used also as lubricant of rolling bearing or ball screw, as explained previously. The speed reduction gear according to the present invention can be used as a speed reduction gear of devices other than the electric power steering apparatus. Furthermore, various change can be given within the limits of the matter described by the claim of this invention.

EXAMPLES

The respective components used in examples and comparative examples are as follows.
<Poly-α-olefin>
PAO-8 having a kinematic viscosity at 40° C. of 48 mm$^2$/s and a kinematic viscosity at 100° C. of 7.9 mm$^2$/s.
<Diurea Grease>
A diurea grease prepared according to "Preparation of diurea grease" below was used.

(Preparation of Diurea Grease)
Diphenylmethane-4,4-diisocyanate was blended into the poly-α-olefin and heated to 70 to 80° C. while stirring. Meanwhile, octylamine and stearylamine were blended into the poly-α-olefin and heated to 70 to 80° C. while stirring. The latter mixture was then added to the former mixture while maintaining the temperature and then first reacted for 30 minutes at 100 to 110° C. while continuing to stir, then raised in temperature to 160 to 170° C., and thereafter allowed to cool to prepare the diurea grease. A blend ratio of diphenylmethane-4,4-diisocyanate, octylamine, and stearylamine was 1:1:1 as a molar ratio. Also, a mass ratio of the diurea thickener and the poly-α-olefin in the diurea grease prepared was: diurea thickener: poly-α-olefin-15:85.
<Zinc Stearate Grease>
A zinc stearate grease prepared according to "Preparation of zinc stearate grease" below was used.
(Preparation of Zinc Stearate Grease)
40 parts by mass of zinc stearate were blended in 60 parts by mass of the poly-α-olefin, and after heating to 140° C. while stirring to completely dissolve the zinc stearate, the mixture was cooled to room temperature while continuing to stir to prepare the zinc stearate grease. The mass ratio of the two components in the zinc stearate grease prepared was:zinc stearate:poly-α-olefin=40:60.
<Sulfur-Based Antioxidant>
(S1) Benzothiazole compound: 2-mercaptobenzothiazole
(S2) Dithiocarbamate compound: Methylene-bis-dibutyldithiocarbamate
(S3) Benzimidazole compound: 2-mercaptobenzimidazole
(S4) Benzothiazole compound: Dibenzothiazyl disulfide
<Other Antioxidants>
(A1) Hindered amine-based antioxidant: Alkyldiphenylamine-based compound (reaction product of diphenylamine and 2,4,4-trimethylpentene)
(A2) Hindered amine-based antioxidant: Dioctyldiphenylamine
(A3) Hindered amine-based antioxidant: Phenyl-α-naphthylamine (N-phenyl-1,1,3,3-tetramethylbutyl naphthaleneamine)
(P1) Phosphorus-based antioxidant: Triphenyl phosphite
(P2) Phosphorus-based antioxidant: Tridecyl phosphite
(B1) Ketone-based antioxidant: β-diketone compound
<Rust Inhibitor>
(Benzotriazole Compound)
Mixture of 1-[N,N-bis(2-ethylhexyl)aminomethyl]-4-benzotriazole and 1-[N,N-bis(2-ethylhexyl)aminomethyl]-5-benzotriazole
(Calcium Sulfonate-Based Rust Inhibitor)
Perbasic Calcium Sulfonate
The following tests were conducted on the lubricant compositions produced in the Examples and Comparative Examples to evaluate their characteristics.
<Evaluation of Attacking Property Against Resin>
Test pieces type IA defined in Japanese Industrial Standards JIS K7162: 1994 (IS0527-2:1993) "Plastics—Determination of tensile propertie—Part 2: Test conditions for moulding and extrusion plastic" were prepared by injection molding nylon-66.

The lubricant compositions of the examples and comparative examples were then respectively coated to a thickness of 1 to 2mm on surfaces of the test pieces and after placing in a thermostatic chamber set at 140° C. and letting stand still for 1440 hours, each lubricant composition was wiped off and a tensile failure strain $\epsilon_B$ was measured in performing a tensile test as defined in JIS K7161: 1994 (1S0527-1:1993) "Plastics—Determination of tensile properties—Part 1: General principles." An extension retention (%) defined by Formula (a):

[Numerical Formula 1]

$$\text{Extension retention (\%)} = (\epsilon_B/\epsilon_{B0}) \times 100 \quad (a)$$

[in the formula, $\epsilon_{B0}$ is the tensile failure strain of a test piece that is not dipped in a lubricant composition] was determined, and each lubricant composition was evaluated whether or not it has an attacking property against resin according to the following standards.

The extension retention was no less than 25%. Does not have attacking property.

The extension retention was less than 25%. Has attacking property.

<Evaluation of Heat Resistance>

(Test 1)

The lubricant compositions of the examples and the comparative examples were respectively coated to a thickness of 1 mm at room temperature (15° C. to 35° C.) on surfaces of normal steel plates (SPCC-SD) (arithmetic mean roughness Ra=0.8 to 1.5 μm), each of which was then weighed, then placed in a constant temperature chamber set at 150° C. and left to stand still for 240 hours, then allowed to cool to room temperature (15° C. to 35° C.), and thereafter weighed again to determine an evaporation amount (% by mass) of the lubricant composition, and the heat resistance was evaluated according to the following standards.

The evaporation amount was less than 12.2%. Small evaporation amount.

(Comprehensive Evaluation)

Based on the results of Tests 1 and 2, the heat resistance of each lubrication composition was evaluated according to the following standards.

The evaporation amount was low and the change of tint was small. Satisfactory heat resistance.

The heat resistance is satisfactory. The evaporation amount was low and the change of tint was medium or large, or the evaporation amount was high and the change of tint was small. Normal level heat resistance.

The evaporation amount was high and the change of tint was large. Poor heat resistance.

Examples 1 to 6 and Comparative Examples 1 to 6

60 g of the diurea grease, 12.5 g of the zinc stearate grease, an antioxidant of the amount shown in Table 1, and 0.10 g of a benzotriazole-based compound as a rust inhibitor were mixed and then the poly-α-olefin was added to adjust the total amount to 100 g.

Each mixture was then stirred and kneaded using a three-roll mill to produce a lubricant composition, which was then evaluated as described above for the attacking property and the heat resistance.

Comparative Example 7

Besides adding 10 g of lithium stearate in place of the zinc stearate grease and then adding the poly-α-olefin to adjust the total amount to 100 g, a lubricant composition was produced in the same manner as in Comparative Example 1 and evaluated as described above for the attacking property and the heat resistance.

The evaluation results of Examples 1 to 6 and Comparative Examples 1 to 7 are shown in Table 1.

TABLE 1

| | Lubricant composition | | Heat resistance | | |
|---|---|---|---|---|---|
| | Antioxidant | | Test 1 | Test 2 | |
| | Type | Blended amount (g) | Attacking property evaluation | Evaporation amount (% by mass) | Change of tint | Evaluation result |
| Example 1 | S1 | 0.5 | ○ | Small | Small | ○ |
| Example 2 | S2 | 2 | ○ | Small | Small | ○ |
| Example 3 | S3 | 1 | ○ | Small | Small | ○ |
| Example 4 | S4 | 2 | ○ | Small | Small | ○ |
| Example 5 | S1 + S2 | 0.5 + 2 | ○ | Small | Small | ○ |
| Example 6 | S2 + S4 | 2 + 1 | ○ | Small | Small | ○ |
| Comparative Example 1 | A1 | 2 | X | Large | Large | X |
| Comparative Example 2 | A2 | 2 | X | Small | Large | Δ |
| Comparative Example 3 | A3 | 2 | X | Large | Large | X |
| Comparative Example 4 | P1 | 2 | X | Large | Large | X |
| Comparative Example 5 | P2 | 2 | X | Large | Large | X |
| Comparative Example 6 | B1 | 2 | X | Large | Large | X |
| Comparative Example 7 | A1 | 2 | X | Small | Small | ○ |

The evaporation amount was no less than 12.2%. Large evaporation amount.

(Test 2)

A tint of each lubricant composition was observed before and after the heating. The change of tint of the lubricant composition was then evaluated according to the following standards.

Small: The tint was white to brown. Small change of tint.

Medium: The tint was dark brown. Medium change of tint.

Large: The tint was dark reddish-brown to black. Large change of tint.

As shown in Table 1, it was confirmed that when zinc stearate and a sulfur-based antioxidant are used in combination as the low friction additive and the antioxidant, respectively, the attacking property against resin can be suppressed while selectively maintaining satisfactory heat resistance of the lubricant composition.

Examples 7 to 10

Besides using 0.5 g of a calcium sulfonate-based rust inhibitor in place of the benzotriazole compound as the rust inhibitor, lubricant compositions were produced in the same manner as in Examples 1 to 3 and 5 and then evaluated for the attacking property and the heat resistance. The results are shown in Table 2.

TABLE 2

| | Lubricant composition | | Attacking property evaluation | Heat resistance | | Evaluation result |
|---|---|---|---|---|---|---|
| | Antioxidant | | | Test 1 | Test 2 | |
| | Type | Blended amount (g) | | Evaporation amount (% by mass) | Change of tint | |
| Example 7 | S1 | 0.5 | ○ | Large | Small | Δ |
| Example 8 | S2 | 2 | ○ | Large | Small | Δ |
| Example 9 | S3 | 1 | ○ | Large | Small | Δ |
| Example 10 | S1 + S2 | 0.5 + 2 | ○ | Large | Small | Δ |

As shown in Table 2 and Table 1, it was confirmed that use of a benzothiazole compound as the rust inhibitor is preferable in terms of improving the heat resistance of the lubricant composition.

Examples 11 to 13

Besides setting the amount of the benzothiazole compound (S1) as the antioxidant to 0.25 g (Example 11), 1 g (Example 12), and 2 g (Example 13), lubricant compositions were produced in the same manner as in Example 1 and then evaluated for the attacking property and the heat resistance. The results are shown together with the results for Example 1 in Table 3.

As shown in Table 3, it was confirmed that the content proportion of the benzothiazole compound (S1) is preferably no less than 0.25% by mass and no more than 2% by mass and especially preferably no less than 0.5% by mass and no more than 2% by mass of the total amount of the lubricant composition.

Examples 14 to 16

Besides setting the amount of the dithiocarbamate compound (S2) as the antioxidant to 0.5 g (Example 14), 1 g (Example 15), and 3 g (Example 16), lubricant compositions were produced in the same manner as in Example 2 and then evaluated for the attacking property and the heat resistance. The results are shown together with the results for Example 2 in Table 4.

TABLE 3

| | Lubricant composition | | Attacking property evaluation | Heat resistance | | Evaluation result |
|---|---|---|---|---|---|---|
| | Antioxidant | | | Test 1 | Test 2 | |
| | Type | Blended amount (g) | | Evaporation amount (% by mass) | Change of tint | |
| Example 11 | S1 | 0.25 | ○ | Large | Medium | Δ |
| Example 1 | S1 | 0.5 | ○ | Small | Small | ○ |
| Example 12 | S1 | 1 | ○ | Small | Small | ○ |
| Example 13 | S1 | 2 | ○ | Small | Small | ○ |

TABLE 4

| | Lubricant composition | | Attacking property evaluation | Heat resistance | | Evaluation result |
|---|---|---|---|---|---|---|
| | Antioxidant | | | Test 1 | Test 2 | |
| | Type | Blended amount (g) | | Evaporation amount (% by mass) | Change of tint | |
| Example 14 | S2 | 0.5 | ○ | Large | Medium | Δ |
| Example 15 | S2 | 1 | ○ | Small | Small | ○ |
| Example 2 | S2 | 2 | ○ | Small | Small | ○ |
| Example 16 | S2 | 3 | ○ | Small | Small | ○ |

As shown in Table 4 it was confirmed that the content proportion of the dithiocarbamate compound (S2) is preferably no less than 0.5% by mass and no more than 3% by mass and especially preferably no less than 1% by mass and no more than 3% by mass of the total amount of the lubricant composition.

Examples 17 to 19

Besides setting the amount of the mercaptobenzimidazole compound (S3) as the antioxidant to 0.5 g (Example 17), 2 g (Example 18), and 3 g (Example 19), lubricant compositions were produced in the same manner as in Example 3 and then evaluated for the attacking property and the heat resistance. The results are shown together with the results for Example 3 in Table 5.

TABLE 5

| | Lubricant composition | | | Heat resistance | | |
| --- | --- | --- | --- | --- | --- | --- |
| | Antioxidant | | | Test 1 | Test 2 | |
| | Type | Blended amount (g) | Attacking property evaluation | Evaporation amount (% by mass) | Change of tint | Evaluation result |
| Example 17 | S3 | 0.5 | ○ | Small | Medium | Δ |
| Example 3 | S3 | 1 | ○ | Small | Small | ○ |
| Example 18 | S3 | 2 | ○ | Small | Small | ○ |
| Example 19 | S3 | 3 | ○ | Small | Small | ○ |

As shown in Table 5, it was confirmed that the content proportion of the mercaptobenzimidazole compound (S3) is preferably no less than 0.5% by mass and no more than 3% by mass and especially preferably no less than 1% by mass and no more than 3% by mass of the total amount of the lubricant composition.

Examples 20 to 22

Besides setting the amount of the benzothiazole compound (S4) as the antioxidant to 1 g (Example 20), 3 g (Example 21), and 4 g (Example 22), lubricant compositions were produced in the same manner as in Example 4 and then evaluated for the attacking property and the heat resistance. The results are shown together with the results for Example 4 in Table 6.

TABLE 6

| | Lubricant composition | | | Heat resistance | | |
| --- | --- | --- | --- | --- | --- | --- |
| | Antioxidant | | | Test 1 | Test 2 | |
| | Type | Blended amount (g) | Attacking property evaluation | Evaporation amount (% by mass) | Change of tint | Evaluation result |
| Example 20 | S4 | 1 | ○ | Small | Large | Δ |
| Example 4 | S4 | 2 | ○ | Small | Small | ○ |
| Example 21 | S4 | 3 | ○ | Small | Small | ○ |
| Example 22 | S4 | 4 | ○ | Small | Small | ○ |

From Table 6, it was confirmed that the content proportion of the benzothiazole compound (S4) is preferably no less than 1% by mass and no more than 4% by mass and especially preferably no less than 2% by mass and no more than 4% by mass of the total amount of the lubricant composition.

DESCRIPTION OF THE SYMBOLS

Electric power steering apparatus, 9: Steering mechanism, 17: Electric motor, 18: Speed reduction gear, 19: Small gear, 20: Large gear

The invention claimed is:

1. A lubricant composition comprising at least a synthetic hydrocarbon oil, an urea thickener, a zinc stearate thickener, and a sulfur-based antioxidant, wherein
the zinc stearate thickener is dissolved in the synthetic hydrocarbon oil to form a grease.

2. The lubricant composition according to claim 1, wherein the sulfur-based antioxidant is at least one type of compound selected from the group consisting of benzothiazole compounds, dithiocarbamate compounds, and benzimidazole compounds.

3. The lubricant composition according to claim 1, further comprising a rust inhibitor and wherein the rust inhibitor is a benzotriazole compound.

4. A speed reduction gear comprising a small gear and a large gear that are mutually engaged and wherein a region including at least a portion of engagement of the small gear and the large gear is filled with the lubricant composition according to claim 1.

5. An electric power steering apparatus comprising an electric motor, which assists steering of a steering mechanism of an automobile, and the speed reduction gear according to claim 4 and wherein an output of the electric motor is transmitted to the steering mechanism via the speed reduction gear.

* * * * *